United States Patent
Feder et al.

(10) Patent No.: US 8,923,811 B2
(45) Date of Patent: Dec. 30, 2014

(54) METHODS AND APPARATUSES FOR DYNAMIC MANAGEMENT OF SECURITY ASSOCIATIONS IN A WIRELESS NETWORK

(75) Inventors: Peretz Moshe Feder, Englewood, NJ (US); Semyon B. Mizikovsky, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1582 days.

(21) Appl. No.: 12/076,176

(22) Filed: Mar. 14, 2008

(65) Prior Publication Data

US 2009/0233578 A1  Sep. 17, 2009

(51) Int. Cl.
| | |
|---|---|
| H04M 1/66 | (2006.01) |
| H04W 4/00 | (2009.01) |
| H04L 12/66 | (2006.01) |
| H04L 12/28 | (2006.01) |
| H04L 29/06 | (2006.01) |
| H04L 9/32 | (2006.01) |
| H04W 12/04 | (2009.01) |
| H04W 84/12 | (2009.01) |

(52) U.S. Cl.
CPC .............. *H04L 63/062* (2013.01); *H04W 84/12* (2013.01); *H04L 63/068* (2013.01); *H04W 12/04* (2013.01)
USPC ........... 455/410; 370/338; 370/352; 370/328; 370/401; 713/150; 713/171

(58) Field of Classification Search
USPC .................. 455/410; 370/338, 352, 328, 401; 713/150, 171
See application file for complete search history.

(56) References Cited

U.S. PATENT DOCUMENTS

| | | | |
|---|---|---|---|
| 6,240,513 B1 * | 5/2001 | Friedman et al. ............. | 713/152 |
| 2003/0091013 A1 * | 5/2003 | Song et al. ................... | 370/338 |
| 2007/0061576 A1 | 3/2007 | Takada et al. | |
| 2007/0201697 A1 | 8/2007 | Altshuller et al. | |
| 2007/0260885 A1 | 11/2007 | Yegani et al. | |
| 2007/0291686 A1 | 12/2007 | Fiat | |
| 2009/0172403 A1 | 7/2009 | Liang et al. | |

FOREIGN PATENT DOCUMENTS

| | | |
|---|---|---|
| CN | 1553600 A | 12/2004 |
| JP | 200760466 A | 3/2007 |
| WO | WO 2004/049672 | 6/2004 |
| WO | WO 2006/135217 | 12/2006 |
| WO | WO-2007134547 A1 | 11/2007 |

OTHER PUBLICATIONS

International Search Report dated Jan. 26, 2010.
Written Opinion dated Jan. 26, 2010.
"Mobile WiMAX—Part I: 'A Technical Overview and Performance Evaluation'", WiMAX Forum, Aug. 2006.

(Continued)

*Primary Examiner* — Vladimir Magloire
*Assistant Examiner* — Natasha Cosme
(74) *Attorney, Agent, or Firm* — Harness, Dickey & Pierce

(57) ABSTRACT

Methods for dynamic management of security associations in a network are provided. According to one method, a security key management entity determines whether to apply a new security key as an active security key based on an existing active security key. Each of the new security key and the existing active security key are associated with a same home agent, and the existing active security key serves as a basis for an existing security association between the home agent and at least one other network element.

19 Claims, 2 Drawing Sheets

(56) References Cited

OTHER PUBLICATIONS

WiMAX Forum, "WiMAX Forum Network Architecture, 'Stage 2 Architecture Tenets, Reference Model and Reference Points' [Part 1]", WiMAX Forum Proprietary, Sep. 14, 2007.

WiMAX Forum, WiMAX Forum Network Architecture,, 'Stage 3: Detailed Protocols and Procedures', WiMAX Forum Proprietary, Jan. 11, 2008.

C. Perkins, Ed., "IP Mobility Support for IPv4", Nokia Research Center, Aug. 2002, The Internet Society (2002).

Dr. Mustafa Ergen, "The Access Service Network in WiMAX: The Role of ASN-GW", Oct. 29, 2007.

International Preliminary Report dated Sep. 23, 2010.

Japanese Office Action dated Nov. 22, 2012 for corresponding Japanese Application No. 2010-550677 (full translation provided).

Chinese Office Action dated Jan. 21, 2013 for corresponding Chinese Application No. 200980108966.4.

Office Action for corresponding Chinese Application No. 200980108966.4 dated Aug. 21, 2014 and English translation thereof.

* cited by examiner

METHODS AND APPARATUSES FOR DYNAMIC MANAGEMENT OF SECURITY ASSOCIATIONS IN A WIRELESS NETWORK

BACKGROUND OF THE INVENTION

WiMAX is a telecommunications technology aimed at providing wireless data communication over relatively long distances. WiMAX is based on the IEEE 802.16e standard.

FIG. 1 illustrates a portion of a conventional WiMAX system according to the current IEEE 802.16e standard (the Wi Forum Network Architecture—Stage 2, Part 1—Release 1.1.1). The system in FIG. 1 provides wireless services such as communication sessions (e.g., data sessions, voice sessions, multimedia sessions, etc.) to endpoints such as the plurality of mobile nodes M1, M2, M3, . . . , MN using a mobile Internet Protocol (IP) framework, which is well-known in the art. A communication session refers to an active communication between two or more endpoints such as mobile nodes.

As discussed herein, the term "mobile node" refers to electronic devices having wireless communication capabilities, such as, a cellular phone, personal digital assistant (PDA), smartphone, laptop computer, etc. More generally, mobile node refers to any electronic device capable of changing its point of attachment from one network or subnetwork to another.

Referring to FIG. 1, the system includes a plurality of access service networks (ASNs) ASN1 and ASN2, a visited connectivity service network V-CSN and a home connectivity service network H-CSN. In conjunction with one another, access service networks ASN1 and ASN2, the visited connectivity service network V-CSN and the home connectivity service network H-CSN provide communications services to one or more mobile nodes M1-MN.

Each of ASN1 and ASN2 represents a communication network that provides mobile nodes with wireless access to a wired network. The access service networks ASN1 and ASN2 may be provided by a network access provider (NAP). An example access service network is a WiMAX access service network, which provides a WiMAX radio access infrastructure to WiMAX network service providers (NSPs). Although only two access service networks are shown in FIG. 1, it is well-known in the art that a WiMAX system may include any number of access service networks.

The access service network ASN1 includes one or more base stations 32-1. As discussed herein, a base station 32-1 represents any suitable device or system that provides wireless services to one or more mobiles M1 and M2 present in the coverage area or cell of the base station 32-1. As is well-known in the art, a base station comprises suitable devices operable to provide wireless services to mobile nodes located in its corresponding coverage area or cell. The base station 32-1 communicates with an ASN gateway (ASN-GW) 36-1, which is also included in access service network ASN1.

As is well-known, the ASN-GW 36-1 is a logical entity that represents an aggregation of control plane functional entities that are either paired with a corresponding function in the access service network ASN1 (e.g., an instance of a base station), a resident function in a CSN (e.g., V-CSN or H-CSN) or a function in another ASN. The ASN-GW 36-1 may also perform bearer plane routing or bridging functions.

As is well-known, each mobile node is associated with a base station, which is typically associated with a single default ASN-GW. However, ASN-GW functions for every mobile node may be distributed among multiple ASN-GWs located in one or more ASN(s).

Still referring to FIG. 1, the ASN-GW 36-1 includes a foreign agent (FA) 44-1 and an authenticator 52-1. As is well-known, the foreign agent 44-1 is a network entity (e.g., a router) that provides routing services to mobile nodes registered with the access service network ASN1. The foreign agent 44-1 routes data to and from mobile nodes currently registered with the access service network ASN1. The foreign agent 44-1 receives data intended for mobile nodes in the access service network ASN1 from the mobile nodes' assigned home agent (e.g., home agent 48 located in the visited connectivity service network V-CSN).

The well-known authenticator 52-1 is a network entity that authenticates requests for access from mobile nodes upon entering the access service network ASN1. Although authenticator 52-1 is shown as separate from foreign agent 44-1 within the ASN-GW 36-1, the authenticator 52-1 may be co-located with the foreign agent 44-1 at any suitable location.

As noted above, the system in FIG. 1 also includes access service network ASN2, which includes one or more base stations 32-2 and an ASN-GW 36-2. The ASN-GW 36-2 includes a foreign agent 44-2 and an authenticator 52-2. Each of these components and functions performed therein are the same as the corresponding components described above with regard to access service network ASN1. Thus, a description of these components is omitted.

The system in FIG. 1 further includes a visited connectivity service network V-CSN and a home connectivity service network H-CSN. Generally, a connectivity service network (CSN) is a set of network functions that provide Internet Protocol (IP) connectivity services to WiMAX subscriber(s) (mobile nodes). A CSN may provide, for example, IP addresses and endpoint parameter allocations to mobile nodes for user sessions, Internet access, AAA server, policy and admission control based on user subscription profiles, ASN-CSN tunneling support, WiMAX subscriber billing and inter-operator settlement, inter-CSN tunneling for roaming, inter-ASN mobility, WiMAX services such as location based services, and connectivity for peer-to-peer services, provisioning, authorization and/or connectivity to IP multimedia services.

As is well-known, a CSN may comprise network elements such as routers, AAA servers, user databases, interworking gateway mobile nodes. A CSN may be deployed as part of, for example, a WiMAX service provider network.

More specifically, the visited connectivity service network V-CSN represents a communication network that provides mobility management for mobiles served by access service networks ASN1 and ASN2 and also provides other operations, for example, authorization operations, host configuration management operations, etc. The visited connectivity service network V-CSN is normally provided by a network service provider (NSP).

Although the visited connectivity service network V-CSN includes all of the above-mentioned components and functionality, only a single home agent 48 and an authentication, authorization, and/or accounting (AAA) function 40 are shown for the sake of clarity. As is well-known, home agent 48 is a network entity (e.g., router) that tunnels datagrams to a mobile node when the mobile node is away from its home network. A tunnel is a path followed by a datagram while encapsulated. The home agent 48 also maintains the current location of mobile nodes to which it is assigned.

The home agent 48 is selected and assigned to serve a communication session of a particular mobile by the AAA server 42 in the home connectivity service network H-CSN and/or the AAA function 40 in the visited connectivity service network V-CSN based on policies and configurations set by the network service provider.

Within the home connectivity service network H-CSN and the visited connectivity service network V-CSN, respectively, the AAA server 42 and the AAA server 40 are network entities (e.g., servers) that provide AAA-related services (e.g., authentication, authorization, accounting, or any combination thereof) associated with a mobile node's subscription. The AAA server 42 and the AAA server 40 differ in that the AAA server 40 is located in the visited connectivity service network (V-CSN) and the AAA server 42 is located in the home connectivity service network H-CSN. Moreover, as will be described in more detail below, the AAA server 40 also differs from the AAA server 42 in that the AAA server 40 may be subordinate to the AAA server 42 in selecting and assigning a home agent to a communication session of a particular mobile. For example, the AAA server 42 may delegate the selection and assignment of the home agent to the AAA server 40 in the visited connectivity service network V-CSN. For example, if main AAA functionality is expected from the H-CSN, then the AAA server 40 in the connectivity service network V-CSN acts as the proxy transporting information to the AAA server 42 in the connectivity service network H-CSN. For the sake of clarity, the AAA server acting as a proxy will be referred to as AAA function.

As is well-known in the art, authentication refers to validating the identity of a mobile node, authorization refers to authorizing a level of service for a mobile node, and accounting refers to tracking resource usage for the mobile node.

The system shown in FIG. 1 utilizes the mobile IP framework. According to the current mobile Internet Protocol version 4 (MIPv4) security framework specified in Internet Engineering Task Force (IETF) RFC3344, tunneling between foreign agent 44-1 and home agent 48 associated with a communication session for mobile node M1 uses a security association based on a security key commonly known to the foreign agent 44-1 and home agent 48 (hereinafter referred to as an FA-HA key).

In this example, the FA-HA key is computed by the authenticator 52-1 in the serving access service network ASN1 based on a home agent security key (hereinafter referred to as an HA-RK key), its associated context and IP addresses of the assigned foreign agent 44-1 (FA-IP) and the home agent 48 (HA-IP). As is well-known, the HA-RK key is a unique 160-bit random number generated by the AAA server 42 for each home agent. The context of each HA-RK key includes the lifetime (or life expiration time) of the HA-RK key and a security parameters index (SPI). The lifetime of the HA-RK key indicates how long the HA-RK key is to be used. More specifically, the lifetime of the HA-RK key specifies for how long the security association (based on the HA-RK) will be valid before re-authentication. The SPI is used to differentiate between different FA-HA keys generated based on respective HA-RK keys. The HA-RK key is also sent to the authenticator 52-1.

As noted above, the authenticator 52-1 computes the FA-HA key based on the received HA-RK key, its associated context and IP addresses of the assigned foreign agent 44-1 (FA-IP) and the home agent 48 (HA-IP). Accordingly, an FA-HA key is generated for each pair of foreign agent and home agent. In other words, a FA-HA key is generated per tunnel between foreign agent 44-1 and home agent 48. The authenticator 52-1 provides the computed FA-HA key to the foreign agent 44-1 for use in communicating with the home agent 48 assigned to the mobile's communication session.

A conventional HA-RK key and FA-HA key deployment scenario will now be described with respect to the system shown in FIG. 1.

Referring to FIG. 1, mobile nodes M1 and M2 located in access service network ASN1 are authenticated by AAA server 42 via the authenticator 52-1. Mobile node M3 located in access service network ASN2 authenticates with AAA server 42 via authenticator 52-2. Both access service networks ASN1 and ASN2 are served by the same local AAA function 40, and as such, all authentication transactions are routed via the AAA function 40.

During authentication, the AAA function 40 recommends its local services (including an assignment of local home agent 48 to each mobile M1-M3 and generation of an HA-RK key for the home agent 48) to the AAA server 42.

Based on its local policy, the AAA server 42 decides whether to assign the home agent 48 to the mobile M1 based on the recommendation of the AAA function 40. Assuming the AAA server 42 decides to do so, the AAA server 42 generates an HA-RK key HA-RK$_{1-1}$ and associated context (hereinafter referred to as HA-RK key and context HA-RK$_{1-1}$) for the home agent 48. The AAA server 42 sends the HA-RK key and context HA-RK$_{1-1}$ to the AAA function 40, which forwards it to authenticator 52-1, and subsequently to the home agent 48 during mobile IP registration.

The AAA server 42 also transmits the IP address of the home agent (HA-IP) to the AAA function 40, which forwards it to authenticator 52-1 at the ASN-GW 36-1.

The ASN-GW 36-1 including the authenticator 52-1 serves as the AAA client for EAP-based subscription authentication transaction.

Upon receiving the HA-RK key and context HA-RK$_{1-1}$, the authenticator 52-1 generates a corresponding FA-HA key FA-HA$_{1-1}$ for the tunnel between foreign agent 44-1 and home agent 48, and sends the same to the foreign agent 44-1. The same FA-HA key FA-HA$_{1-1}$ is also computed by the home agent 48. The FA-HA key FA-HA$_{1-1}$ serves as the security key for datagrams tunneled between foreign agent 44-1 and home agent 48.

Turning now to mobile node M2, if the AAA server 42 again accepts the recommendation of the AAA function 40, the AAA server 42 assigns the home agent 48 to the mobile node M2 and generates the HA-RK key and context HA-RK$_{1-2}$ for the home agent 48. The AAA server 42 sends the HA-RK key and context HA-RK$_{1-2}$ to the AAA function 40, which forwards it to authenticator 52-1, and subsequently to the home agent 48 during mobile IP registration.

Upon receiving the HA-RK key and context HA-RK$_{1-2}$, the authenticator 52-1 generates a corresponding FA-HA key FA-HA$_{1-2}$ for the tunnel between foreign agent 44-1 and home agent 48, and sends the same to the foreign agent 44-1. The same FA-HA key FA-HA$_{1-2}$ is also computed by the home agent 48. The FA-HA key FA-HA$_{1-2}$ serves as another security key for datagrams tunneled between foreign agent 44-1 and home agent 48.

Turning to mobile node M3, if the AAA server 42 again assigns the home agent 48 based on the recommendation of the AAA function 40, the AAA server 42 generates another HA-RK key and context HA-RK$_{2-3}$ for the home agent 48. The AAA server 42 sends the HA-RK key and context HA-RK$_{2-3}$ to the AAA function 40, which forwards it to authenticator 52-2, and subsequently to the home agent 48 during mobile IP registration.

Upon receipt of the HA-RK key and context HA-RK$_{2-3}$, the authenticator 52-2 generates a corresponding FA-HA key FA-HA$_{2-3}$ for the tunnel between the foreign agent 44-2 and the home agent 48, and sends the same to the foreign agent 44-2. The same FA-HA key $FA\text{-}HA_{2\text{-}3}$ is also computed by the home agent 48. The FA-HA key $FA\text{-}HA_{2\text{-}3}$ serves as the security key for datagrams tunneled between foreign agent 44-2 and home agent 48.

In this example, if the mobile node M1 subsequently relocates into access service network ASN2, the foreign agent 44-2 requests another FA-HA key $FA\text{-}HA_{2\text{-}1}$ (key for a tunnel between the foreign agent 44-2 and home agent 48) from the authenticator 52-1. The authenticator 52-1 generates the FA-HA key $FA\text{-}HA_{2\text{-}1}$ based on the HA-RK key and context $HA\text{-}RK_{1\text{-}1}$ maintained at the authenticator 52-1 and sends the same to the foreign agent 44-2. The same FA-HA key $FA\text{-}HA_{2\text{-}1}$ is also generated at the home agent 48. The FA-HA key $FA\text{-}HA_{2\text{-}1}$ also serves as the security key for datagrams tunneled between foreign agent 44-2 and home agent 48.

Referring back to FIG. 1, the lifetime and SPI of HA-RK keys are managed by the AAA server 42 that assigns the HA-RK key and context. The AAA server 42 is responsible for generating and delivering a new HA-RK key and context to each authenticator 52-1, 52-2 and/or home agent 48 prior to the expiration of an active HA-RK key and context at the authenticators 52-1, 52-2.

During any EAP authentication procedure, if the AAA server 42 recognizes that the remaining lifetime of an active HA-RK key at, for example, authenticator 52-1 or home agent 48 is less than the newly assigned master session key (MSK) lifetime, the AAA server 42 sends a new HA-RK context to the authenticator 52-1 and the home agent 48.

As the result of successful EAP-based subscription authentication procedure, both the EAP client (e.g., the mobile node M1) and the EAP server (the AAA server 42) generate the MSK. The AAA server 42 assigns the lifetime for this MSK based on its policy. The lifetime (or life expiration time) of the MSK specifies for how long this security association will be valid before re-authentication. Both MSK and MSK lifetime are subsequently delivered to the authenticator 52-1 at the end of the EAP authentication procedure.

Typically, the AAA server 42 does not retain a knowledge of previous security associations distributed for a given pair of HA and authenticator, because they are associated with different authentication events. For the AAA server 42 it would be troublesome to maintain a knowledge of whether or not any HA-RK key in the authenticator is currently within its allocated lifetime. Therefore, at the completion of a new authentication event, the AAA server 42 creates and sends a new random HA-RK key. Typically, the AAA server 42 sets the lifetime of the HA-RK at least equal to, or longer than a lifetime of the new MSK. This way the security association lifetime of the FA-HA tunnel is not limited by the subscription authentication lifetime.

Currently, however, upon receipt of a new HA-RK key and context at authenticator 52-1 or home agent 48, older versions of HA-RK keys and contexts are not immediately deprecated or deleted. Instead, each HA-RK key remains active until expiration of its lifetime. As a result, multiple HA-RK keys and contexts must be maintained at the authenticator 52-1 and home agent 48 at all times.

In the above example, the HA-RK security keys are provided by the AAA server 42 via the AAA function 40. In another example, however, the AAA function 40 may generate and send HA-RK security keys to the authenticators 52-1, 52-2 and home agent 48. In this process, when mobile node M1 accesses visited connectivity service network V-CSN, the AAA function 40 suggests the local home agent 48 to the AAA server 42. If the AAA server 42 agrees with the recommendation (after checking its policies), the agreement is communicated back to the AAA function 40. The AAA function 40 then assigns the home agent 48 to the mobile node M1 and also assigns an HA-RK security key in the same manner as described above with regard to the AAA server 42.

Conventionally, for a given mobile node authenticators 52-1, 52-2 are selected based on a deployment configuration of a serving system, but cannot be predicted by an associated AAA or home agent 48. Similarly, the home agent 48 is selected based on policies of the AAA server 42, but cannot be predicted by the associated authenticator 52-1, 52-2 or foreign agent 44-1, 44-2. As a result, the home agent 48 and/or the authenticator 52-1, 52-2 may concurrently receive different HA-RK security keys for the same given association between authenticator and home agent.

The lack of coordination between the HA-RK security keys results in the creation of a plurality of tunnels and security associations for the same home agent-foreign agent pair. The resulting plurality of security associations results in ambiguity at the home agent and the authenticator.

More generally, if there are N AAA servers involved in home agent assignment and P authenticators involved in FA-HA key distribution (wherein each authenticator is associated with M AAA servers and M≤N), then the home agent must maintain at least N×P keys, each authenticator must maintain at least M keys, and each foreign agent must maintain at least M×P keys.

SUMMARY OF THE INVENTION

Example embodiments provide methods for dynamic management of security associations in a wireless network.

At least one illustrative embodiment provides a method for dynamic management of security associations in a network. According to this method, a security key management entity determines whether to apply a new security key as an active security key based on an existing active security key. Each of the new security key and the existing active security key are associated with a same home agent and the existing active security key serves as a basis for an existing security association between the home agent and at least one other network element. The active security key and the resultant security association are used to protect data transmitted between the home agent and the at least one other network element.

At least one other illustrative embodiment provides a method for dynamic management of security associations in a network. According to this method, a security key management entity determines whether to retain or discard a new security key based on an existing active security key and a currently pending security key at the security key management entity. The existing active security key serves as a basis for an existing security association between at least two network elements. The active security key and the resultant security association are used to protect data transmitted between the at least two network elements.

At least one other illustrative embodiment provides a network gateway. The network gateway may include a security key management entity for dynamic management of security associations in a network. The security key management entity is configured to determine whether to apply a new security key as an active security key based on an existing active security key. Each of the new security key and the existing active security key are associated with a same home agent and the existing active security key serves as a basis for an existing security association between the home agent and at least one other network element. The active security key and the resultant security association are used to protect data transmitted between the at least two network elements.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware in existing communication networks. For example, program modules and functional processes discussed herein may be implemented using existing hardware at existing network elements or control nodes (e.g., a home agent or authenticator shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Figure 1:
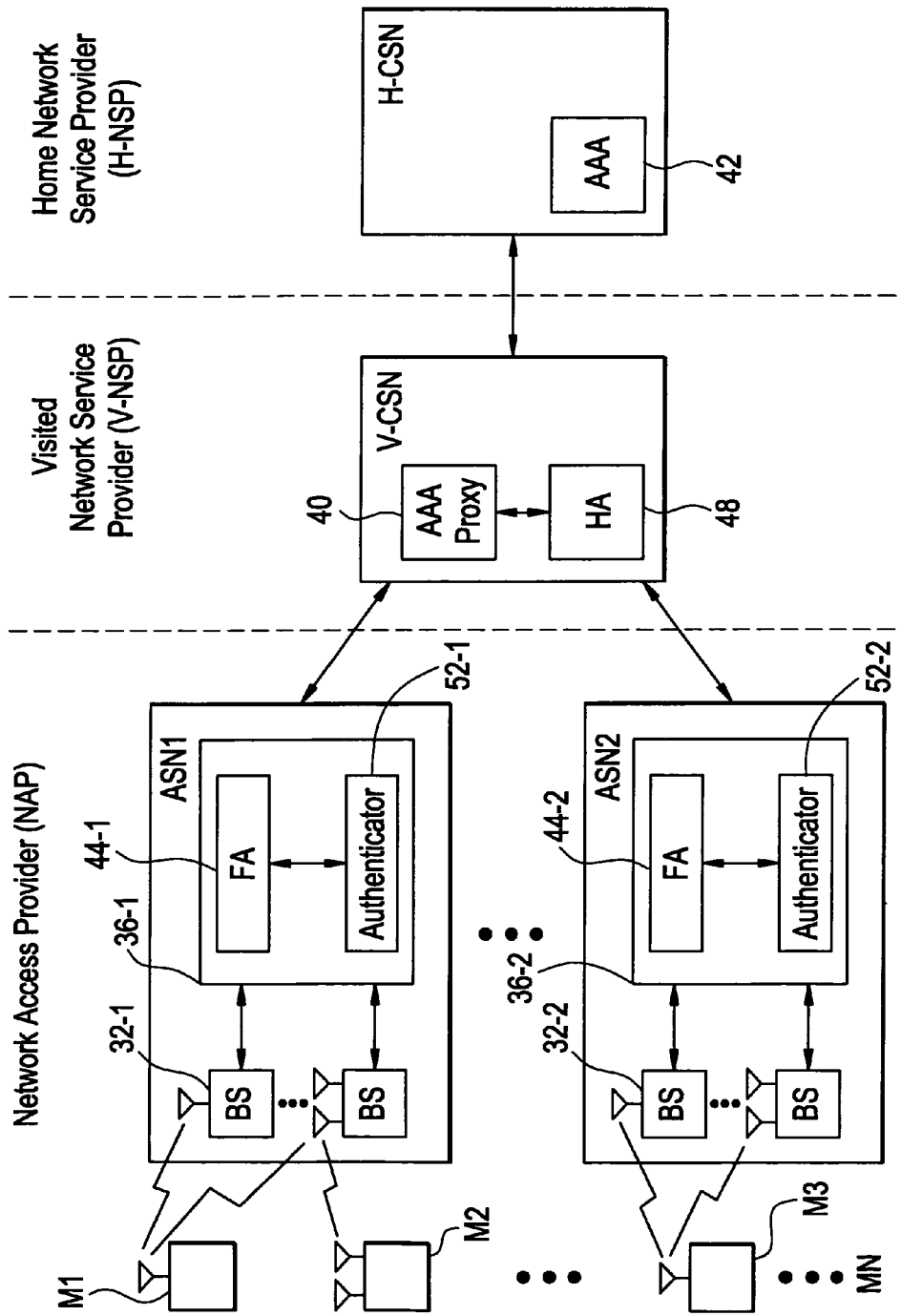
FIG. 1 illustrates a portion of a conventional WiMAX system.
Figure 2:
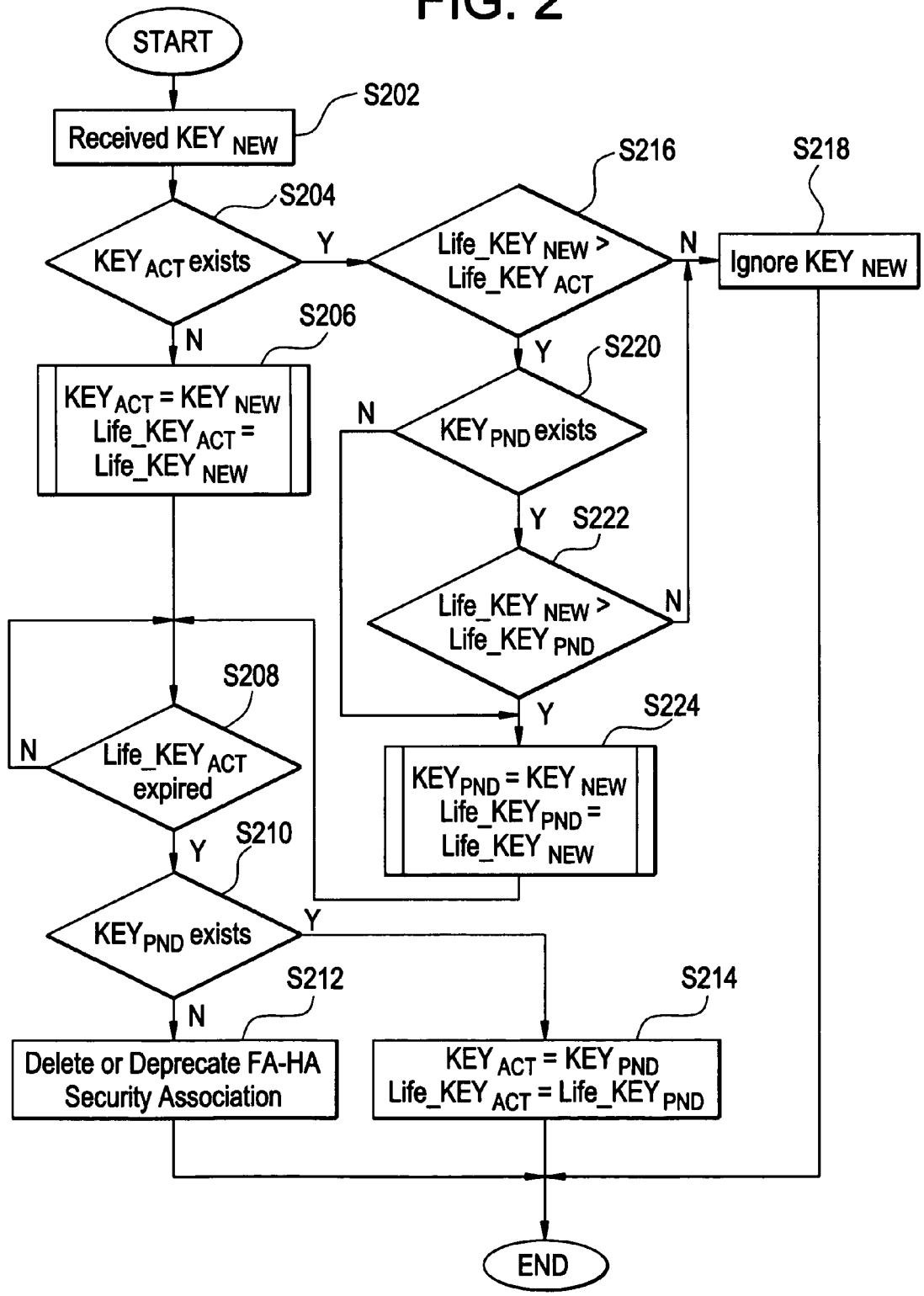
FIG. 2 illustrates a method for dynamically managing security associations in a wireless network according to an example embodiment.

FIG. 2 is a flow chart illustrating a method for dynamic management of security associations or keys according to illustrative embodiments. The method shown in FIG. 2 will be described with regard to the example system shown in FIG. 1, in particular with respect to the functions/acts being performed by the home agent 48 or authenticator 52-1. Collectively, authenticators 52-1, 52-2 and home agent 48 may be referred to as a security key management entity, a network entity, or a key management entity.

An example embodiment will be described with regard to the authenticator 52-1. However, it will be understood that the same dynamic management method may be performed at the authenticator 52-2 and/or the home agent 48.

As discussed above, the authenticator 52-1 maintains an HA-RK key and context associated with tunnels between each home agent 48 and foreign agent 44-1 needed for communication to mobile nodes in access service network ASN1. However, the authenticator 52-1 does not retain any knowledge of which AAA server generated and sent the HA-RK key and context.

As discussed above, the authenticator 52-1 may receive a new HA-RK key and context from the AAA server 42 if the remaining lifetime (or life expiration time) of an active HA-RK key at the authenticator 52-1 is less than a newly assigned MSK lifetime and/or in response to authentication of a new mobile node within the access service network ASN1.

Utilizing the method shown in FIG. 2, the authenticator 52-1 (and/or the home agent 48) is capable of dynamically managing security associations for tunnels between home agents and foreign agents so as to reduce the number of HA-RK and/or FA-HA keys.

Referring to FIGS. 1 and 2, the authenticator 52-1 receives a newly generated HA-RK key $KEY_{NEW}$ and associated context at step S202. As discussed above, authenticator 52-1 serves multiple mobile sessions. Each session is authenticated when established, and as a result, at least some of the served sessions are authenticated by authenticator 52-1. At the end of authentication process, the AAA server 42 assigns the home agent 48 for the session, and thus, the same home agent 48 may be assigned for multiple sessions handled by the same authenticator 52-1. Accordingly, the authenticator 52-1 may receive a new value of HA-RK, while already having a valid HA-RK for communicating with the same home agent 48 assigned for the previous sessions.

Returning to FIG. 2, at step S204, the authenticator 52-1 determines whether an active HA-RK key $KEY_{ACT}$ associated with home agent 48 already exists. The authenticator 52-1 determines whether an active HA-RK key $KEY_{ACT}$ is already associated with home agent 48 by checking the security key associated with the assigned HA. This may be done, for example, by parsing a memory storing security keys in association with home agent identifiers. If the authenticator 52-1 determines that there is no existing HA-RK key associated with the home agent 48 (e.g., no active key context $KEY_{ACT}$ exists), the newly received HA-RK key $KEY_{NEW}$ is activated and becomes HA-RK key $KEY_{ACT}$ at step S206. The active HA-RK key $KEY_{ACT}$ is used as the basis for generating FA-HA keys until the active HA-RK key $KEY_{ACT}$ expires.

The active HA-RK key $KEY_{ACT}$ expires when the lifetime of the HA-RK key $Life\_KEY_{ACT}$ lapses. The lifetime of an HA-RK key is the maximum value of a lapse timer assigned by, for example, the AAA server 42. Once this timer ends, the security association based on the HA-RK key ceases.

Once the authenticator 52-1 determines that the lifetime of the active key $Life\_KEY_{ACT}$ has expired at step S208, the authenticator 52-1 determines whether a pending HA-RK key $KEY_{PND}$ exists at step S210. The pending HA-RK key $KEY_{PND}$ will be described in more detail below with regard to steps S216, S220 and S222. If no pending HA-RK key $KEY_{PND}$ exists, the authenticator 52-1 deprecates or deletes the security association between the home agent 48 and the foreign agent 44-1 at step S212.

Returning to step S210, if a pending HA-RK key $KEY_{PND}$ exists, the authenticator 52-1 activates the pending HA-RK key $KEY_{PND}$, at step S214, and the pending HA-RK key $KEY_{PND}$ becomes the active HA-RK key $KEY_{ACT}$. The active HA-RK key $KEY_{ACT}$ is then used as the basis for generating FA-HA keys until the active HA-RK key $KEY_{ACT}$ expires.

Returning to step S204 of FIG. 2, if the authenticator 52-1 determines that an active HA-RK key $KEY_{ACT}$ exists, the authenticator 52-1 determines whether the newly received HA-RK key $KEY_{NEW}$ will expire before the active HA-RK key $KEY_{ACT}$ at step S216. The authenticator 52-1 determines whether the newly received HA-RK key $KEY_{NEW}$ will expire before the active HA-RK key $KEY_{ACT}$ by comparing the lifetime of the newly received HA-RK key $Life\_KEY_{NEW}$ with the lifetime of the active HA-RK key $Life\_KEY_{ACT}$.

If the lifetime of the active HA-RK key $Life\_KEY_{ACT}$ extends past (e.g., is greater than) the lifetime of the newly received HA-RK key $Life\_KEY_{NEW}$, the authenticator 52-1 determines that the newly received HA-RK key $KEY_{NEW}$ will expire before the active HA-RK key $KEY_{ACT}$.

If the authenticator 52-1 determines that the newly received HA-RK key $KEY_{NEW}$ will expire before the active HA-RK key $KEY_{ACT}$, the authenticator 52-1 ignores and discards the newly received HA-RK key $KEY_{NEW}$ at step S218.

Returning to step S216, if the authenticator 52-1 determines that the newly received HA-RK key $KEY_{NEW}$ will not expire before the active HA-RK key $KEY_{ACT}$, the authenticator 52-1 determines whether a pending HA-RK key $KEY_{PND}$ for the home agent 48 already exists at step S220.

If a pending HA-RK key $KEY_{PND}$ exists, the authenticator 52-1 determines whether the newly received HA-RK key $KEY_{NEW}$ will expire before the pending HA-RK key $KEY_{PND}$ at step S222. The authenticator 52-1 determines whether the newly received HA-RK key $KEY_{NEW}$ will expire before the pending HA-RK key $KEY_{PND}$ in the manner described above with regard to step S216.

If the newly received HA-RK key $KEY_{NEW}$ will expire before the pending HA-RK key $KEY_{PND}$, the authenticator 52-1 ignores and discards the newly received HA-RK key $KEY_{NEW}$ at step S218.

Returning to step S222, if the authenticator 52-1 determines that the pending HA-RK key $KEY_{PND}$ will expire before the newly received HA-RK key $KEY_{NEW}$, the authenticator 52-1 replaces the current pending key HA-RK key $KEY_{PND}$ with the newly received HA-RK key $KEY_{NEW}$ at step S224. The process then proceeds to step S208 and continues as discussed above.

Returning to step S220, if no pending HA-RK key $KEY_{PND}$ for the home agent 48 exists at the authenticator 52-1, the process proceeds to step S224 and continues as discussed above.

The method shown in FIG. 2 may also be performed at the authenticator 52-2 in the same or substantially the same manner as discussed above with regard to authenticator 52-1. A similar method may also be performed at the home agent 48. Because the method performed at the home agent 48 is substantially similar to the method performed at the authenticator 52-1, only a brief discussion will be provided below.

Referring again to FIGS. 1 and 2, the home agent 48 receives a newly generated HA-RK key $KEY_{NEW}$ and associated context at step S202. At step S204, the home agent 48 determines whether an active HA-RK key $KEY_{ACT}$ already exists. The home agent 48 determines whether an active HA-RK key $KEY_{ACT}$ already exists in the same manner as described above with respect to the authenticator 52-1.

If the home agent 48 determines that there is no existing HA-RK key, the newly received HA-RK key $KEY_{NEW}$ is activated and becomes HA-RK key $KEY_{ACT}$ at step S206. The active HA-RK key $KEY_{ACT}$ is used as the basis for generating FA-HA keys until the active HA-RK key $KEY_{ACT}$ expires.

Once the home agent 48 determines that the lifetime of the active key $Life\_KEY_{ACT}$ has expired at step S208, the home agent 48 determines whether a pending HA-RK key $KEY_{PND}$ exists at step S210.

If no pending HA-RK key $KEY_{PND}$ exists, the home agent 48 deprecates or deletes its security association with the foreign agent 44-1 at step S212.

Returning to step S210, if a pending HA-RK key $KEY_{PND}$ exists, the home agent 48 activates the pending HA-RK key $KEY_{PND}$ and the pending HA-RK key $KEY_{PND}$ becomes the active HA-RK key $KEY_{ACT}$ at step S214. The active HA-RK key $KEY_{ACT}$ is then used as the basis for generating FA-HA keys until the active HA-RK key $KEY_{ACT}$ expires.

Returning to step S204 of FIG. 2, if the home agent 48 determines that an active HA-RK key $KEY_{ACT}$ exists, the home agent 48 determines whether the newly received HA-RK key $KEY_{NEW}$ will expire before the active HA-RK key $KEY_{ACT}$ at step S216.

If the home agent 48 determines that the newly received HA-RK key $KEY_{NEW}$ will expire before the active HA-RK key $KEY_{ACT}$, the home agent 48 ignores and discards the newly received HA-RK key $KEY_{NEW}$ at step S218.

Returning to step S216, if the home agent 48 determines that the newly received HA-RK key $KEY_{NEW}$ will not expire before the active HA-RK key $KEY_{ACT}$, the home agent 48 determines whether a pending HA-RK key $KEY_{PND}$ already exists at step S220.

If a pending HA-RK key $KEY_{PND}$ exists, the home agent 48 determines whether the newly received HA-RK key $KEY_{NEW}$ will expire before the pending HA-RK key $KEY_{PND}$ at step S222. The home agent 48 determines whether the newly received HA-RK key $KEY_{NEW}$ will expire before the pending HA-RK key $KEY_{PND}$ in the manner described above with regard to step S216.

If the newly received HA-RK key $KEY_{NEW}$ will expire before the pending HA-RK key $KEY_{PND}$, the home agent 48 ignores and discards the newly received HA-RK key $KEY_{NEW}$ at step S218.

Returning to step S222, if the home agent 48 determines that the pending HA-RK key $KEY_{PND}$ will expire before the newly received HA-RK key $KEY_{NEW}$, the home agent 48 replaces the current pending key HA-RK key $KEY_{PND}$ with the newly received HA-RK key $KEY_{NEW}$ at step S224. The process then proceeds to step S208 and continues as discussed above.

Returning to step S220, if no pending HA-RK key $KEY_{PND}$ exists, the process proceeds to step S224 and continues as discussed above.

Using the above-described illustrative embodiments, the number of HA-RK keys retained and/or tunnels supported at a given home agent and/or authenticator may be reduced. For example, by utilizing illustrative embodiments discussed herein, if there are N AAA servers assigning HA-RK keys and contexts to M authenticators, each home agent maintains at least (1×M) HA-RK keys and contexts.

Although the method of FIG. 2 includes a receiving step S202, it will be understood that one or more of the home agent 48 or the authenticator 52-1 may be co-located with an AAA server or AAA function, and thus, may itself generate an HA-RK key $KEY_{NEW}$.

The invention being thus described, it will be obvious that the same may be varied in many ways. Such variations are not to be regarded as a departure from the invention, and all such modifications are intended to be included within the scope of the invention.

We claim:

1. A method for dynamic management of security associations in a network, the method comprising:
    first determining, at a security key management component, whether to apply a new security key as an active security key based on an expiration of an existing active security key, each of the new security key and the existing active security key being associated with a same home agent, the existing active security key being used as a basis for an existing security association between the home agent and at least one foreign agent; and
    second determining, at the security key management, whether to apply the new security key as a current pending security key based on an expiration of an existing current pending security key if the first determining determines to apply the new security key as the active security key; and
    replacing the existing active security key with the new security key based on the expiration of the existing active security key, the first determining and the second determining.

2. The method of claim 1, further comprising:
    ignoring the new security key based on the first determining.

3. The method of claim 2, wherein the ignoring ignores the new security key if the first determining determines that the existing active security key expires after the new security key, and
    the method further comprises protecting transmitted or received data using the existing security association generated based on the existing active security key.

4. The method of claim 2, wherein ignoring ignores the new security key if the first determining determines that the existing active security key expires after the new security key, and
    the method further comprises at least one of transmitting and receiving data, the data being protected using the existing security association.

5. The method of claim L wherein the replacing replaces the existing active security key with the new security key if,
    the existing active security key expires,
    the first determining determines that the new security key expires after the existing active security key, and
    the second determining determines that the new security key expires after the current pending security key, and
    the method further comprises at least one of transmitting and receiving data, the data being protected using a security association generated based on the new security key.

6. The method of claim 1, further comprising:
    creating a new security association between the home agent and the at least one other network element based on the new security key, if the replacing replaces the existing active security key with the new security key.

7. The method of claim 1, wherein the first determining includes comparing a life expiration time of the new security key and a life expiration time of the existing active security key to determine whether the new security key expires after the existing active security key; and
    the second determining determines whether to apply the new security key as the current pending security key if the life expiration time of the new security key is after the life expiration time of the existing active security key.

8. The method of claim 7, wherein the second determining includes comparing a life expiration time of the new security key and a life expiration time of the current pending security key to determine whether the new security key expires after the current pending security key; and
    replacing the current pending security key with the new security key if the life expiration time of the new security key is after the life expiration time of the current pending security key.

9. The method of claim 1, further comprising:
    receiving, at the security key management component, the new security key from a server.

10. A method for dynamic management of security associations in a network, the method comprising:
    determining, at a security key management component, whether to retain or discard a new security key based on an expiration of an existing active security key and a current pending security key, the existing active security key being used as a basis for a current security association between at least two network elements; and
    replacing the existing active security key with the new security key based on the determining and the expiration of the existing active security key.

11. The method of claim 10, further comprising:
    retaining the new security key if the new security key expires after the existing active security key and the current pending security key.

12. The method of claim 10, wherein the determining includes,
    first comparing a life expiration time of the new security key and a life expiration time of the existing active security key to determine whether the new security key expires after the existing active security key; and
    second comparing the life expiration time of the new security key and a life expiration time of the current pending security key if the life expiration time of the new security key is after the life expiration time of the existing active security key, wherein
    the replacing replaces the existing active security key with the new security key if,
        the determining determines, based on the first comparing and the second comparing, that the new security key expires after the existing active security key and the current pending security key, and
        the existing active security key expires.

13. The method of claim 12, further comprising:
    creating a security association between the at least a first and a second network element based on the new security key, if the replacing replaces the existing active security key with the new security key.

14. The method of claim 12, wherein upon comparing the life expiration times of the new security key and the current pending security key, the method further comprises:
    replacing the current pending security key with the new security key if, the life expirations time of the new security is after the life expiration time of the current pending security key.

15. A network gateway comprising:
a security key management component for dynamic management of security associations in a network, the security key management component being configured to,
- first determine whether to apply a new security key as an active security key based on an expiration of an existing active security key, each of the new security key and the existing active security key being associated with a same home agent, the existing active security key being used as the basis for an existing security association between the home agent and at least one foreign agent;
- second determine whether to apply the new security key as a current pending security key based on an expiration of an existing current pending security key, if the security key management component first determines to apply the new security key as the active security key; and
- replace the existing active security key with the new security key based on the expiration of the existing active security key and the second determining by the security key management component.

16. The network gateway of claim 15, wherein the security key management component is further configured to ignore the new security key if the security key management component first determines that the existing active security key expires after the new security key, and
the security key management component is further configured to protect transmitted or received data using the existing security association.

17. The network gateway of claim 15, wherein the security key management component is further configured to ignore the new security key if the security key management component first determines that the existing active security key expires after the new security key, and
the security key management component is further configured to at least one of transmit and receive data, the data being protected using the existing security association.

18. The network gateway of claim 15, wherein the security key management component is configured to replace the existing active security key with the new security key if,
the existing security key expires,
the security key management component first determines that the new security key expires after the existing active security key, and
the security key management component second determines that the new security key expires after the current pending security key, and
the security key management component is further configured to at least one of transmit and receive data, the data being protected using a security association generated based on the new security key.

19. The network gateway of claim 15, wherein the security key management component is configured to first determine whether to apply the new security key as an active security key by comparing a life expiration time of the new security key and a life expiration time of the existing active security key-to determine whether the new security key expires after the existing active security key, and
the security key management component is configured to second determine whether to apply the new security key as the current pending security key by comparing the life expiration time of the new security key and a life expiration time of the existing current pending security key.

\* \* \* \* \*